(12) United States Patent
Bax et al.

(10) Patent No.: US 11,339,542 B2
(45) Date of Patent: May 24, 2022

(54) DEVICE AND METHOD FOR PROCESSING A SURFACE

(71) Applicant: ART EN RENO BVBA, Oud-Turnhout (BE)

(72) Inventors: Franciscus Andreas Anna Maria Bax, Oud-Turnhout (BE); Linda Anna Emiel Noeyens, Oud-Turnhout (BE)

(73) Assignee: ART EN RENO BVBA, Oud-Turnhout (BE)

( * ) Notice: Subject to any disclaimer, the term of this patent is extended or adjusted under 35 U.S.C. 154(b) by 0 days.

(21) Appl. No.: 16/768,417

(22) PCT Filed: Nov. 29, 2018

(86) PCT No.: PCT/IB2018/059461
§ 371 (c)(1),
(2) Date: May 29, 2020

(87) PCT Pub. No.: WO2019/106598
PCT Pub. Date: Jun. 6, 2019

(65) Prior Publication Data
US 2020/0291587 A1    Sep. 17, 2020

(30) Foreign Application Priority Data
Nov. 29, 2017  (NL) ...................... 2019994

(51) Int. Cl.
*E01C 23/088*   (2006.01)
*B28D 1/28*   (2006.01)
(Continued)

(52) U.S. Cl.
CPC ............ *E01C 23/0885* (2013.01); *B28D 1/28* (2013.01); *E01C 23/094* (2013.01); *F16F 15/124* (2013.01)

(58) Field of Classification Search
CPC .. E01C 23/0885; E01C 23/094; E01C 23/088; E01C 23/127; E01C 23/0933; B28D 1/28; B28D 1/181; F16F 15/124
(Continued)

(56) References Cited

U.S. PATENT DOCUMENTS 2,004,154 A    6/1935   Beatty
3,146,559 A *  9/1964   Wilkinson ............. B24B 7/186
                                               451/353
(Continued)

FOREIGN PATENT DOCUMENTS

DE   10 2010 014 711 A1   10/2011
DE      102010014711 A1   10/2011
GB           845659        8/1960

OTHER PUBLICATIONS

International Searching Authority; International Search Report for International application No. PCT/B2018/059461; dated Feb. 12, 2019.
(Continued)

*Primary Examiner* — Janine M Kreck
*Assistant Examiner* — Michael A Goodwin
(74) *Attorney, Agent, or Firm* — McDonnell Boehnen Hulbert & Berghoff LLP

(57) ABSTRACT

The invention relates to a device for processing a hard surfacing, the device comprising a rotatable hammering unit configured to process the hard surfacing under the hammering unit with hammers, the hammering unit comprising a substantially flat first and second disc with a number of hammer wheels on the underside of the second disc, wherein the coupling between the first and second disc is formed by one or more vibration-damping coupling elements. The
(Continued)

invention also relates to a method for processing a hard surfacing with a vehicle provided with the device described herein.

22 Claims, 4 Drawing Sheets

(51) Int. Cl.
  *E01C 23/09* (2006.01)
  *F16F 15/124* (2006.01)
(58) Field of Classification Search
  USPC .......................................................... 299/41.1
  See application file for complete search history.

(56) References Cited

U.S. PATENT DOCUMENTS

| | | | | |
|---|---|---|---|---|
| 4,155,596 | A * | 5/1979 | Brejcha | B24B 7/186 299/14 |
| 4,188,696 | A * | 2/1980 | Collins | A47L 13/02 125/5 |
| 4,634,188 | A * | 1/1987 | Persson | B28D 1/181 125/5 |
| 4,668,017 | A | 5/1987 | Peterson et al. | |
| 5,184,429 | A * | 2/1993 | Parsons | B24B 7/186 299/41.1 |
| 5,980,371 | A * | 11/1999 | McConnell | B24D 7/16 125/5 |
| 6,076,895 | A * | 6/2000 | Ino | E01C 23/094 299/36.1 |
| 6,287,181 | B1 * | 9/2001 | Dekok | B24B 7/22 125/25 |
| 2005/0127741 | A1 * | 6/2005 | Davey | E01C 23/0885 299/39.9 |
| 2006/0078384 | A1 * | 4/2006 | Jacob | E01C 23/0885 404/94 |
| 2016/0207170 | A1 | 7/2016 | Fogelberg | |

OTHER PUBLICATIONS

International Searching Authority; Written Opinion of the International Searching Authority for International application No. PCT/IB2018/059461; dated Feb. 12, 2019.

* cited by examiner

DEVICE AND METHOD FOR PROCESSING A SURFACE

BACKGROUND

The invention relates to a device and method for processing a hard surfacing, particularly a road surface.

There are many types of surface paving, for instance for the purpose of a road, square, pavement and the like. A surface can for instance be paved with an asphalt paving, including asphalt concrete, a concrete paving, including concrete slabs and continuously reinforced concrete roads, and paving elements, including clinkers, concrete paving stones, brick and natural stone. It may sometimes be necessary to process such a paved surfacing, for instance in order to flatten protrusions such as bumps in an asphalt paving, edges of concrete slabs which lie askew, transitions between road surface parts and the like so as to (once again) even out the surface of the surfacing. The surface of a surfacing can be processed in different ways. In addition to grinding or polishing of the surfacing, it can be hammered. This hammering is also referred to as bush hammering. The upper surface of the surfacing is here struck with one or more hammers or chisels so that a structure in the form of a large number of dents is struck into the surface. The result of the hammering is a relatively rough surface with a repetitive pattern of small dents, but can also produce a relatively smooth final result wherein no or hardly any individual dents are still visible.

The hammering of a road surface can be performed manually. The dents are here chiselled into the upper surface of a paving stone (usually a natural stone) one by one by a person. Over the years, machines have also been developed with which a road surface can be processed by guiding a number of grinding discs over the surfacing. Such machines can consist of a self-propelled, mobile vehicle, for instance a tractor or the like, on which is provided a frame with a number of rotating discs provided with chisels. The discs are dragged or pushed over the surfacing and extend herein parallel relative to the road surface. While being pushed or dragged along, the discs rotate at a determined speed just above the road surface, so that the chisels are able to hammer the upper surface thereof.

In a known type of bush hammering machine small wheels with bush hammers are arranged on two or more parallel discs rotating independently of each other. The discs are mounted on a vehicle which can travel over the surfacing. When the discs rotate, the hammers come into contact with the surfacing and strike small dents therein. When the vehicle moves (in an (optionally linear) direction of travel ($P_1$)) during rotation of the two or more discs, a strip of processed surfacing can thus be obtained.

A drawback of the known machine is that it has a short lifespan, or in any case requires frequent repairs and/or maintenance. The size of the surface of the surfacing which can be treated will in practice be limited (characteristically several hundred square metres) before more repairs or maintenance have to be performed on the machine.

Rather high vibration levels further occur during the bush hammering with the known machine, both in the discs and in the drive of the discs. These vibrations are transmitted to the vehicle and/or to the driver thereof. Both the vehicle itself and the driver will eventually suffer because of this, which results in damage or excessive wear in the case of the vehicle and in discomfort, or worse, for the driver.

A further drawback of the known devices with two or more bush hammering discs is that the final result of the bush hammering treatment is sometimes insufficient, for instance because certain unevennesses in the surfacing, particularly the larger bumps in the surfacing, can be smoothed out insufficiently well by the discs.

OVERVIEW

It is an object of the present invention to provide an improved device and method for processing a surfacing, wherein at least one of the above stated drawbacks is at least partially obviated.

It is also an object of the invention to provide a device and method with which a surfacing can be flattened in accurate manner without the equipment used herein being impacted too much.

It is a further object of the invention to provide a device and method wherein a high degree of surface-tracking flatness can be realized.

According to a first aspect of the invention, a device is for this purpose provided for processing a hard surfacing, the device comprising:
 a frame to be mounted on a vehicle;
 a support coupled to the frame;
 a drive motor, mounted on the support, with drive shaft for rotating a hammering unit relative to the support;
 a rotatable hammering unit configured to process the hard surfacing under the hammering unit with hammers, the hammering unit comprising:
 a substantially flat first disc;
 a substantially flat second disc coupled via one or more coupling elements to the first disc and extending parallel to the first disc;
 wherein the flat first disc is connected to the drive shaft of the drive motor for the purpose of rotating the first and second flat discs in the plane of the first disc,
 wherein the coupling elements are vibration-damping coupling elements which are configured to provide a vibration-damping coupling between the first and second disc.

The second disc can here comprise on the flat side remote from the first disc a plurality of hammer wheel holders with hammer wheels rotatable therein. In such embodiments the hammer wheel holders can be distributed substantially uniformly along a circular periphery, the central point of which corresponds to the central point of the second disc, and the rotation shafts of the hammer wheels can be oriented substantially along respective lines through the central point of the second disc.

Making use of two mutually coupled plates which can preferably be rotated as one whole by the drive motor makes it possible to realize an extremely stiff construction with a high degree of flatness. The hammer wheel holders can be arranged on this flat construction with great accuracy. Owing to the great stiffness, the high degree of flatness can also be preserved during the actual hammering of the surfacing itself, when great forces are exerted on the discs. This high degree of stiffness in combination with the (permanent) flatness of the discs has the result that, when the hammering unit reaches a relatively large and/or firm bump in the surfacing, almost the whole weight of the hammering unit will press onto this bump and evening out of this bump is realized extremely effectively and quickly.

The high degree of flatness of the discs (also during the actual processing of the surfacing, when great (dynamic) forces are exerted on the hammering unit) can be expressed in a determined maximum dimensional variation. It is for instance possible to obtain a flatness with a maximum dimensional variation between random, mutually adjacent measuring points over the relevant flat surface of the second disc of the hammering unit of 10 mm, preferably 5 mm, preferably only 1 mm.

As already stated above, the great stiffness of the hammering unit means that the surfacing can also be evened out with a high degree of flatness. The stiff construction further makes it possible (in the case of a determined requirement of minimum flatness of the processed surfacing) to arrange the hammer wheel holders at a relatively great radial distance relative to the central point of the second disc. In the case of a radius of the disc varying from 0.4 m to about 1.3 m or more, the hammer wheel holders can for instance be placed almost 0.8-2.6 m apart. This means that a vehicle moving linearly over a surfacing is able to treat a relatively wide strip or section of the surfacing (characteristically with a width of between 0.8 m and 2.6 m) in one operation.

In determined embodiments of the invention the coupling between the first and second disc is formed by one or more rigid coupling elements for providing a rigid coupling between the first and second disc. In other embodiments the coupling between the first and second disc is however formed by one or more vibration-damping, particularly elastic, coupling elements for providing a vibration-damping coupling between the first and second disc. In the case of a rigid coupling the stiffness of the whole of first and second disc will have a greater rigidity than when the coupling takes a vibration-damping, for instance elastic, form. An advantage of a rigid coupling relative to a vibration-damping coupling is that the second disc has a very high degree of flatness. In the case of a small bump in the surfacing the whole weight of the discs will also press onto this bump, so that this bump can be hammered flat quickly and efficiently and/or a high degree of flatness of the surfacing can be realized.

When the coupling between the first and second disc is formed only by the one or more vibration-damping coupling elements, these coupling elements provide not only for a fixed connection between the first and second disc, so that the second disc has the same rotation direction and speed as the first disc, but also for the damping of the vibrations being transmitted from the hammer wheels and the second disc to the first disc. In the case of a vibration-damping coupling the drive motor and optional other components of the hammering unit will be less impacted by the vibrations generated in the device, this enhancing the lifespan of the device. The flatness of the second disc will generally however be slightly less than in the case of a rigid coupling.

The rotatable hammering unit is rotatable relative to the drive motor, the support and the frame and, when the device is mounted on a vehicle, also rotatable relative to the vehicle. The support can here be formed by a disc, for instance a disc parallel to the other discs, but can also comprise a protective cover for protecting the surrounding area against pieces of stone which have come loose and are flying about. In a determined embodiment the cover is embodied such that it surrounds the first and second discs on all sides, except for the side where the hammer wheel holders with hammer wheels are mounted. An optimal protection of the surrounding area is in this way brought about.

The device preferably has only one hammering unit with only one first and second disc. The construction makes it possible to use only one single rotatable hammering unit, while sufficient hammering effectiveness can still be realized. This means that relatively little power is also required to even out the surfacing (also when the surfacing is particularly hard, for instance a surfacing in the form of a roadway consisting of concrete slabs placed adjacently of each other), and that a relatively light drive motor can suffice. This moreover has the advantage over embodiments in which there are two or more second discs, which may or may not rotate counter to each other, that relatively little power is necessary to rotate the one pair of discs (and less stringent standards are thus required of the drive motor and of the power supply of the drive motor), the surfacing can be processed more uniformly and/or the forces occurring in the construction can be absorbed better, which can enhance the lifespan of the device.

In an embodiment the frame is configured to allow the support with the hammering unit mounted thereon to track the surfacing. The frame can for instance be arranged via a (first) pivoting unit on the vehicle for pivoting in upward and downward direction. When the vehicle travels over the surfacing, the hammering unit can compensate for possible height variations in the road surface, for instance a gentle upward or downward incline, by pivoting the frame slightly upward or downward. The frame can further comprise a second pivoting unit on which the hammering unit is mounted. In determined embodiments of the invention the second pivoting unit is embodied such that the hammering unit can only hinge around an imaginary pivot axis extending substantially parallel to the first disc and substantially transversely of the direction of travel. When the vehicle travels over the surfacing in the direction of travel, the position of the hammering unit can adjust to possible variations in the angle of inclination of the surfacing. In this way the hammering unit can track macro variations of the (height and inclination of the) surfacing during travelling of the vehicle, while micro variations (for instance bumps in the surfacing) are removed. A surface-tracking flatness of the surfacing can thus be realized by the process.

The frame can be pivotable such that the combined mass of the frame, drive motor and rotatable hammering unit is suitable for having the hammer wheels press under the influence of the force of gravity with sufficient (pressing) force on the surfacing to be able to even out the surfacing with rotating hammering unit and moving vehicle. In determined embodiments provisions can be arranged for increasing the pressing force, for instance a provision in the form of a hydraulic, pneumatic or electric lifting cylinder mounted on the vehicle and the frame, although in other embodiments such provisions can be dispensed with, and said mass provides for a sufficient pressing force.

The optionally vibration-damping coupling elements are arranged between the first and second disc at positions which are substantially uniformly distributed over one or more concentric circles, the central points of which correspond to the central point of the second disc. When the positions of the optionally vibration-damping elements are distributed over the surface of the discs in this manner, a very stable construction can be obtained.

A vibration-damping coupling element can be formed by a block of resilient material, such as rubber, which is mounted with a first mounting element on the first disc on a first side and is mounted with a second mounting element on the second disc on a second, opposite side. Such a block can be solid or be provided with cavities. It is important that no rigid connection occurs between the two discs. The mounting elements of the block on each of the discs thus preferably do not make contact with each other.

In order to prevent the situation that, when vibration-damping coupling elements are applied, possible vibrations still reach the first disc and are transmitted to the drive motor, more particularly to the drive shaft of the drive motor, despite these coupling elements, the first disc is preferably connected with vibration dampers to the drive motor.

According to a determined embodiment, the hammer wheels are manufactured from steel and have a running surface which is provided with a number of steel protrusions (hammers) extending substantially radially from the running surface. These protrusions are moved over the surfacing (for instance a linear movement as a result of the vehicle advancing and a rotating movement as a result of the hammering unit being rotated) in order to thus flattened the surfacing.

According to a second aspect of the invention, a vehicle is provided which is provided with the device defined herein, which is coupled releasably to the vehicle. The device is here arranged on the vehicle for pivoting in at least the upward and downward direction.

According to a third aspect of the invention, a method is provided for processing a hard surfacing, the method comprising of:

placing the hammering unit on the surfacing;
displacing the hammering unit over the surfacing with the vehicle and simultaneously rotating the hammering unit with the drive motor for the purpose of processing the surfacing, particularly flattening the surfacing and/or arranging a surface structure in the surfacing, by hammering with the hammer wheels.

BRIEF DESCRIPTION OF THE DRAWINGS

Further advantages and features and details of the invention will be elucidated on the basis of the following description thereof. Reference is made in the description to figures, in which:

FIG. 1A is a schematic top view of the vehicle and a processed section of the road surface;

DETAILED DESCRIPTION

Several embodiments of a vehicle provided with a device according to the invention and of the method for processing the surfacing are given hereinbelow. The processing of the surfacing can relate to the flattening thereof by hammering of the surfacing, and can also relate to the arranging of a surface structure therein by the hammering. The surfacing can further be a paved surface. The surfacing is for instance formed by stone, concrete or asphalt, particularly by a road surface manufactured from stone, concrete or asphalt.

Figure 1:
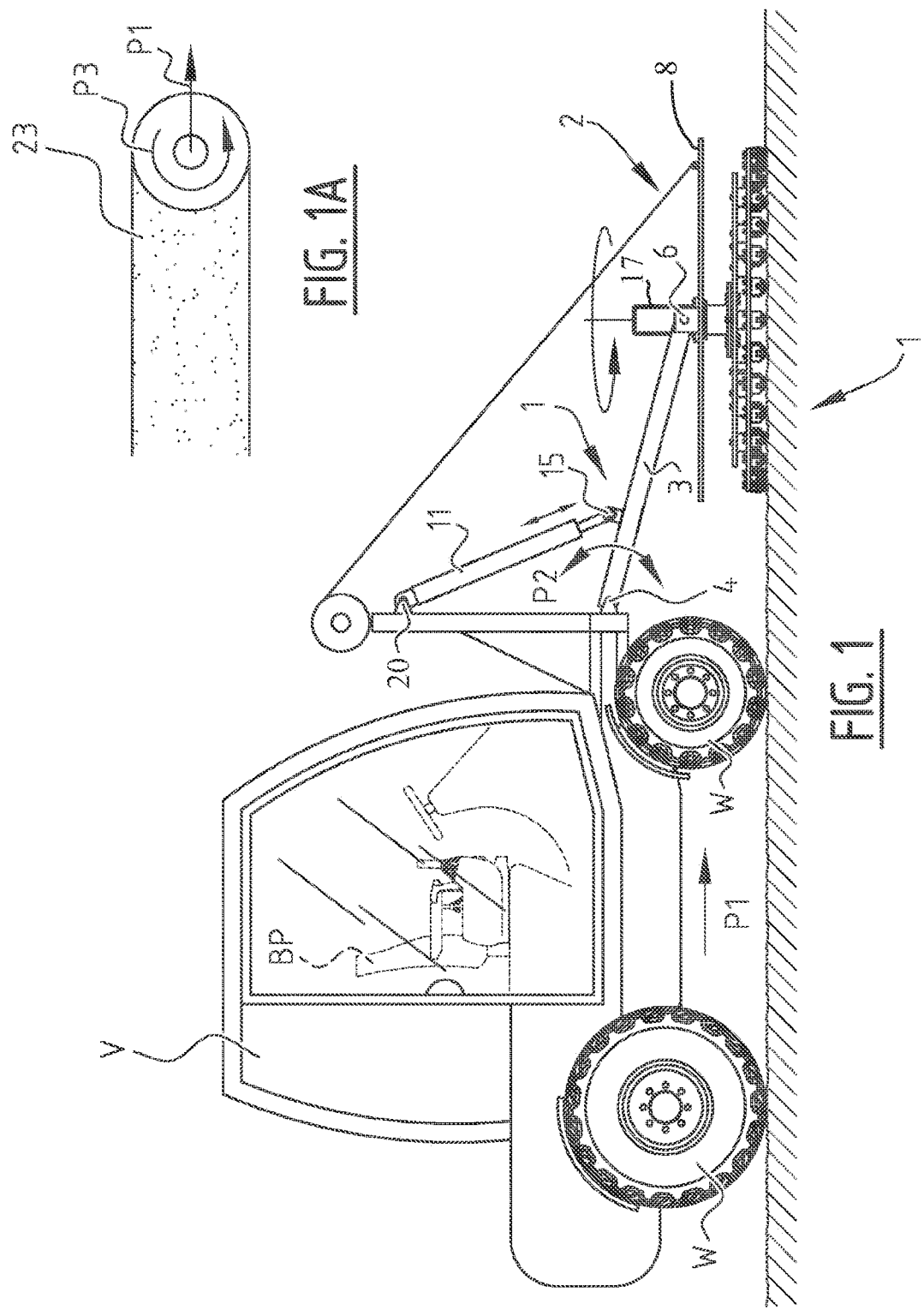
FIG. 1 is a schematic view of a vehicle provided with the embodiment of a device according to the invention.

FIG. 1 shows a vehicle (V), for instance a self-propelling vehicle on four wheels (W) which is driven using a combustion engine to drive over a surfacing (direction of travel $P_1$). The vehicle (V) is steered by a driver or operating person (BP, not shown). The vehicle further comprises a power supply (not shown), for instance an electric power supply, for the electric drive motor of a hammering unit to be described hereinbelow. The vehicle further comprises a power supply (not shown) for powering lifting means whereby the hammering unit can be lifted or can be lowered, for instance in the form of a hydraulic, pneumatic or electric lifting cylinder.

Figure 2:
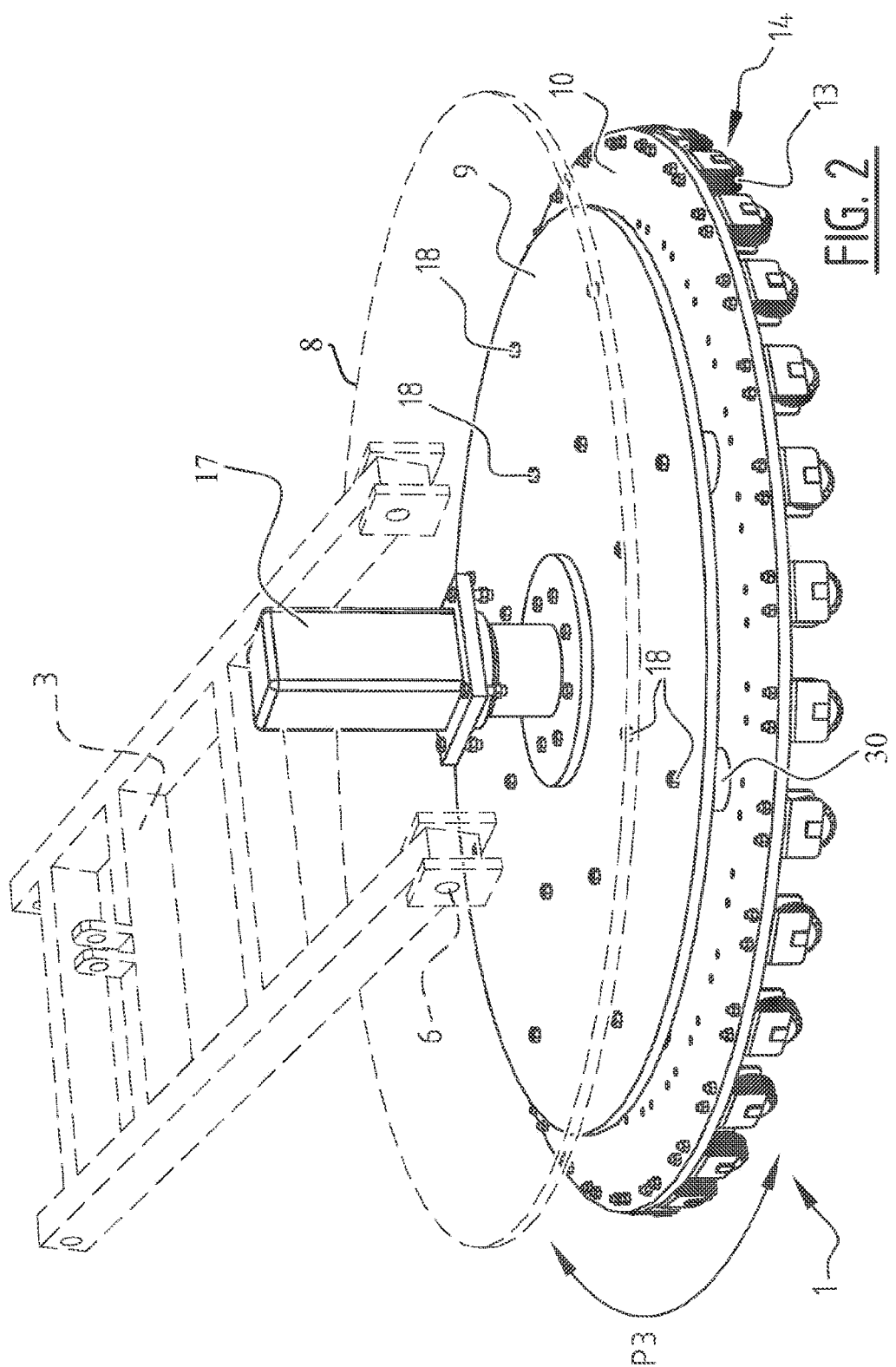
FIG. 2 is a perspective view of the device according to the embodiment of FIG. 1.

Mounted on the front side of the vehicle is a device 1 according to an embodiment of the invention. Device 1 comprises inter alia a hammering unit 2, a pivotable frame 3 between the hammering unit and the vehicle, a support 8 and a drive motor 17. Frame 3 is arranged for pivoting on the front side of the vehicle using hinges 4 of a first pivoting unit so that the frame is able to pivot upward (to a transport position) and pivot downward (to a position of use, see for instance FIG. 1, pivoting directions $P_2$). Frame 3 is arranged on the opposite outer end with hinges 6 of a second pivoting unit. These hinges enable the pivoting of hammering unit 2 around an imaginary axis extending parallel to the upper surface of hammering unit 2 and perpendicularly of the direction of travel, but hammering unit 2 is unable to pivot in other directions. By moreover making use of two (see FIG. 2) or more hinges 6 the hammering unit is held firmly in place during rotation thereof and rotation of the disc-shaped support 8 described hereinbelow is prevented.

The frame 3 with the components such as the support, drive motor and hammering unit mounted thereon can be pivoted upward or downward (direction $P_2$) with the above stated lifting means in the form of a lifting cylinder 11. At the one outer end of lifting cylinder 11 it is mounted pivotally on (a frame of) the vehicle itself with hinge 20, while on the opposite outer end hinge 15 provides for a pivoting connection to pivotable frame 3. Lifting cylinder 11 is for instance a hydraulic lifting cylinder which can be controlled via the hydraulics of the vehicle itself. The operating person (BP) in the vehicle can turn frame 3 in upward and downward direction ($P_2$) from his/her sitting position using the lifting cylinder 11.

Figure 3:
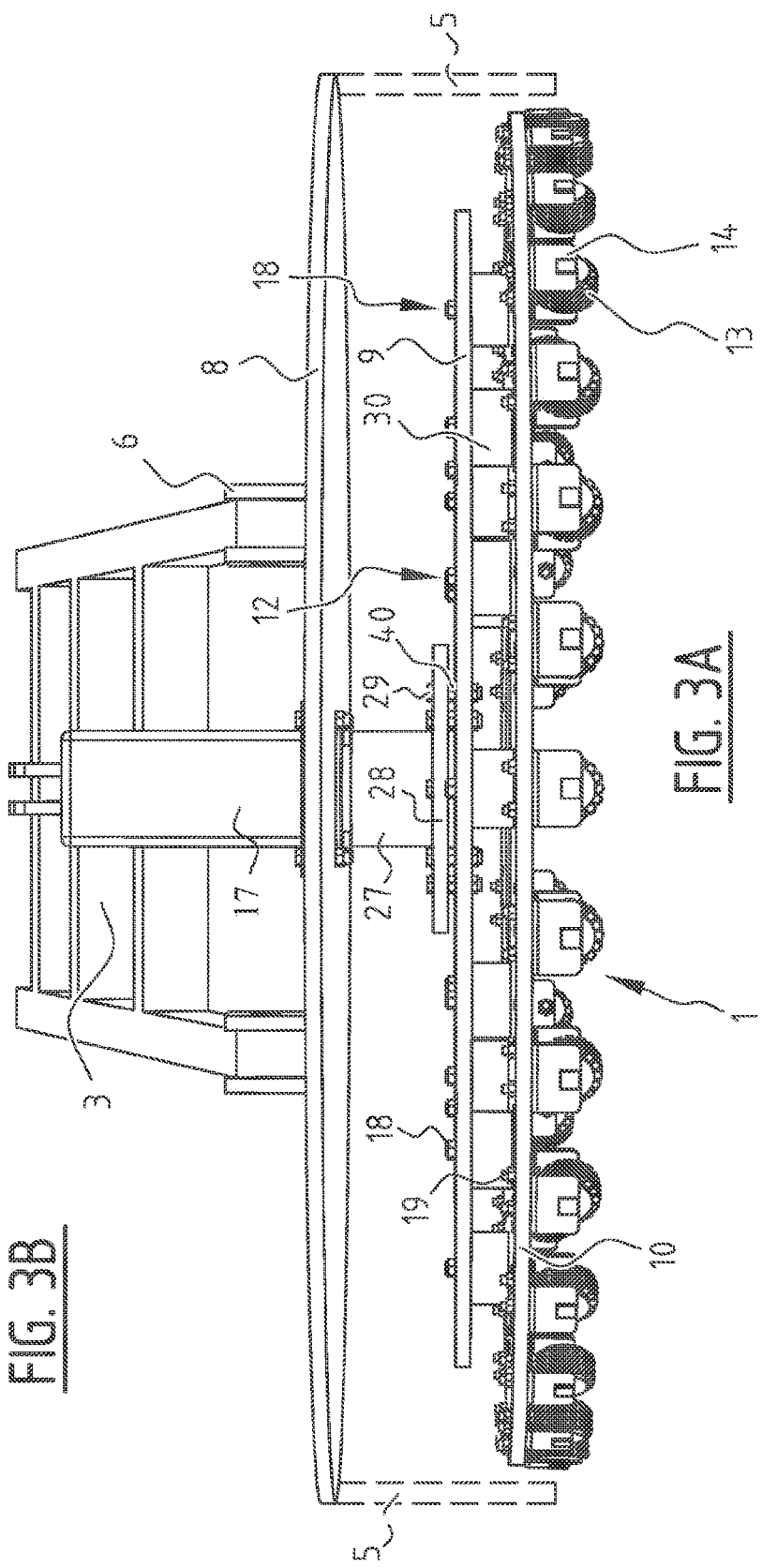
FIGS. 3A and 3B are respectively a side view and a detail of the embodiment of FIGS. 1 and 2.

Hinge 6 of frame 3 is connected to the above stated support 8. In the embodiment shown in FIG. 1 the support is formed as a circular disc 8. It is indicated in FIG. 3A with broken lines 5 that disc-shaped support 8 can also take the form of a cover, wherein the depending parts of the cover extend radially adjacently of hammering unit 2.

Arranged in the middle (centre) of disc-shaped support 8 is a mounting plate 16 of drive motor 17. The drive motor is mounted fixedly on the support.

The above stated hammering unit 2 comprises two substantially circular metal discs 9, 10, and wherein the central point of the first disc substantially corresponds to the central point of the second disc. More particularly, the hammering unit comprises a first disc 9 and a second disc 10 arranged parallel thereto. Drive shaft 27 is attached using a support plate 28 and a number of fastening means 29 (screws) to the first (upper) disc 9. Driving (rotation) of drive shaft 27 relative to the (stationary) drive motor 17 entails a corresponding rotation (direction $P_3$) of the first (upper) disc 9 and the lower (second) disc 10 mounted fixedly thereon.

In order to ensure that the first and second disc 9, 10 form a stiff and substantially inflexible whole, the two discs 9, 10 are coupled to each other using a large number of coupling elements 30. Coupling elements 30 are shown in FIG. 3A as vibration-damping coupling elements. These vibration-damping coupling elements damp possible vibrations in lower disc 10 despite the mounting of the second disc on the first disc. In the shown embodiment coupling elements 30 are formed by a number of solid, cylindrical blocks of elastic material, for instance rubber or the like. These blocks are mounted on first plate 9 using screws 18 and on second plate 10 using screws 19. The screws 18 which are arranged in upper plate 9 do not make contact with the screws 19 arranged in the lower plate. A high degree of damping of the vibration from lower plate 10 to upper plate 9 can be achieved by not allowing the plates and the fastening screws to come into contact with each other but to have the only contact between the two discs take place via the vibration-damping blocks.

In the shown embodiment coupling elements 30 are arranged in two concentric imaginary circles with different radii, the central points of which correspond to the central point of the second (lower) disc 10. Coupling elements 30 are further distributed substantially symmetrically around the central point of the first and second disc. In the shown embodiment eight coupling elements are used per circle (so a total of 16 coupling elements) to couple the two discs to each other. In other embodiments this number can be smaller or greater.

In other embodiments (not shown) the coupling elements take the form of rigid coupling elements. The coupling elements can for instance be manufactured from steel blocks which lie directly against (i.e. without intermediate vibration-damping material) the underside of first disc 9 and upper side of second disc 10. These embodiments further correspond to the above described vibration-damped embodiments, and a further description of the construction is therefore dispensed with.

Both in the vibration-damped embodiments and in the rigid embodiments a large number of hammer wheel holders 14 is arranged on the underside of second disc 10, i.e. on the side remote from drive motor 15, along a peripheral edge of disc 10. In the shown embodiment the hammer wheel holders 14 can be mounted releasably on the second disc so that they can be replaced in simple manner and/or can be mounted on the second disc at different positions, for instance at different radial distances relative to the central point.

Each of these hammer wheel holders 14 comprises one or more hammer wheels 13 rotating therein via a shaft 12. As can be seen in FIG. 3A, the hammer wheels have a running surface which is provided with a number of steel protrusions extending substantially radially from the running surface. These steel protrusions form the hammers with which the surfacing is processed when the hammer wheels are moved over the surfacing.

Hammer wheel holders 14 are distributed substantially uniformly along a circular periphery, the central point of which corresponds to the central point of second disc 10, and the rotation shafts 12 of hammer wheels 13 extend along imaginary lines through the central point of second disc 10. The wheels can hereby be rotated over the surfacing with relatively little friction force.

The number of hammer wheels also depends on the dimensions of the hammering unit. In determined embodiments 32 to 60 (or more) hammer wheels are applied, wherein the hammer wheels are preferably placed as close together as possible.

When the wheels on the underside of the lower (second) disc 10 are rotated (direction $P_3$, FIG. 1A) over the surface of the surfacing and the vehicle simultaneously travels over the surfacing in a determined direction ($P_1$), a wide strip or section 23 of the surfacing will be treated in one operation. Large areas can in this way be processed in rapid and efficient manner.

It will be apparent that in order to be able to flatten a surfacing the hammering unit 2 must not only rotate, but must also advance (translate) over the surfacing in a determined direction. At a rotation speed of more than 100 rotations per minute it is possible in determined embodiments to drive the vehicle in a determined direction at a walking pace. In this way a relatively hard surfacing, such as a concrete slab or roadway asphalt, can be evened out quickly and effectively. Because the construction of the upper and lower plate 9, 10 is extremely stiff, it will be possible to realize an accurate evening out of the surfacing. Because the vibrations between the second and first plate can further be absorbed by coupling elements 30, the chance of damage to the construction, particularly drive motor 15 thereof, is smaller.

In order to reduce this chance still further, vibration dampers 40 (FIG. 3B) are also provided between support 28 and the upper (first) disc 9 of hammering unit 2. These vibration dampers are arranged such that, on the one hand, the possibly remaining vibrations are damped still further and drive shaft 27 is impacted even less, and a relatively rigid coupling between drive shaft 27 and hammering unit 2 can on the other hand be preserved.

Figure 4:
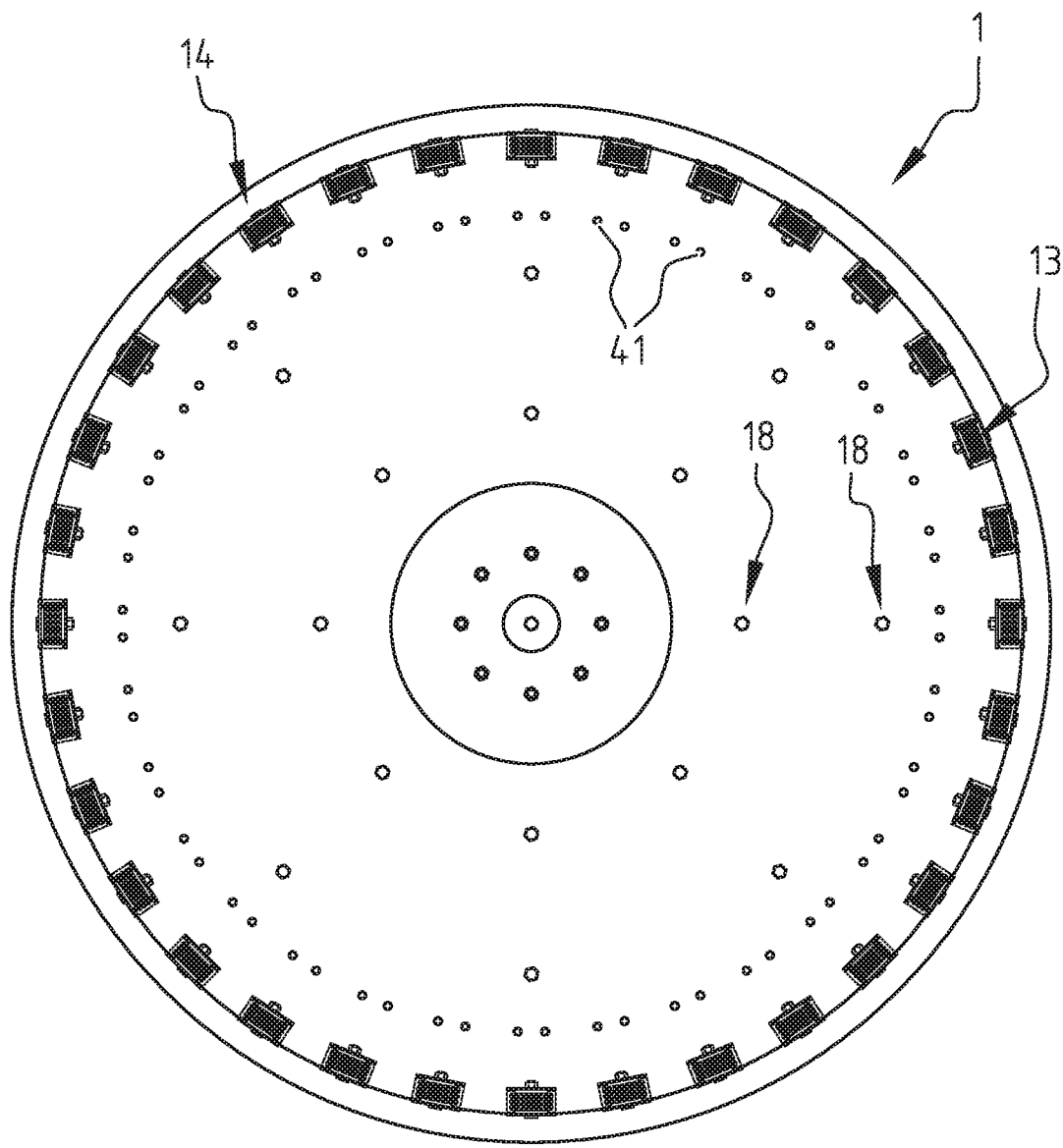
FIG. 4 is a bottom view of the embodiment of FIGS. 1-3.

It is shown in the shown embodiment that the diameter of first disc 9 is smaller than that of second disc 10. This has been done in order to enable the above stated hammer wheel holders to be arranged at different positions placed radially further inward. It is for instance possible to arrange hammer wheel holders 14 in the second row of openings 41 (FIG. 4) in lower disc 10, such that the hammer wheel holders are positioned closer together. In this way a section with a slightly smaller width can be realized in a translating movement of the vehicle than would be the case were the hammer wheel holders situated at the original positions. As stated above, the hammer wheel holders 14 can be arranged releasably on disc 10, for instance via a per se known bolt/nut connection.

It is shown in the shown embodiment that sections with different widths can be made on the surfacing by adjusting the diameter of the circle along which the hammer wheel holders 14 are arranged. In practice the diameter can for instance be varied between 0.8 m and 2.4 m, and the width of the strip of treated surface thus also varies between 0.8 m and 2.4 m.

According to embodiments of the invention, the device can be embodied for surface-tracking processing (flattening) of the surfacing. This is understood to mean that the hammering unit preserves the rough variations (macro variations) in the height and/or the position of the upper surface of the surfacing (for example an incline in a road surface), but smooths out detail variations in the height and/or the position thereof (for instance connecting edges between adjoining concrete slabs of the road surface). The present invention is not limited to the embodiment thereof described herein. The rights sought are defined by the following claims, within the scope of which countless modifications can be envisaged.

The invention claimed is:

1. Device for processing a hard surfacing, the device comprising:
   a frame to be mounted on a vehicle;
   a support coupled to the frame;
   a drive motor, mounted on the support, with drive shaft for rotating a hammering unit relative to the support;
   a rotatable hammering unit configured to process the hard surfacing under the hammering unit by hammering, grinding and/or polishing the hard surfacing with hammers, the hammering unit comprising:
   a substantially flat first disc;
   a substantially flat second disc coupled via at least three coupling elements to the first disc and extending parallel to the first disc;
   wherein the flat first disc is connected to the drive shaft of the drive motor for a purpose of rotating the first and second flat discs in a plane of the first disc, wherein the second disc comprises on a flat side remote from the first disc a plurality of hammers, wherein the hammers are distributed substantially uniformly along a circular periphery, a central point of which corresponds to a central point of the second disc; and wherein the at least three coupling elements are vibration-damping coupling elements configured to provide a vibration-damping coupling between the first and second disc, wherein essentially the only coupling between the first and second disc is formed by the at least three vibration-damping coupling elements, and wherein the at least three vibration-damping coupling elements are arranged between the first and second disc at positions which are substantially uniformly distributed over one or more concentric circles, the central points of which correspond to the central point of the second disc.

2. Device as claimed in claim 1, wherein the vibration-damping coupling elements take an at least partially elastic form.

3. Device as claimed in claim 1, wherein the rotatable hammering unit has only a single first and second disc and/or wherein the second disc is in operation rotated either in clockwise direction or in counter-clockwise direction.

4. Device as claimed in claim 1, wherein the drive motor is configured to rotate the first and second disc as one whole.

5. Device as claimed in claim 1, wherein the frame is configured to allow the support with the hammering unit mounted thereon to track the surfacing.

6. Device as claimed in claim 1, wherein the frame comprises a pivoting unit whereby the device can be arranged on the vehicle for pivoting in upward and downward direction.

7. Device as claimed in claim 6,
wherein the frame comprises a second pivoting unit on which the hammering unit is mounted for pivoting, and
wherein the hammering unit is configured to be hinged only around an imaginary axis extending substantially parallel to the first disc and substantially transversely of a direction of travel.

8. Device as claimed in claim 1, wherein at least one of the coupling elements is a vibration-damping coupling element comprising a block of resilient material, which is mounted with a first mounting element on the first disc on a first side and is mounted with a second mounting element on the second disc on a second, opposite side.

9. Device as claimed in claim 8, wherein the blocks of a plurality of coupling elements are distributed substantially symmetrically around the central point of the first disc and the central point of the second disc.

10. Device as claimed in claim 1, wherein the first disc is connected with vibration dampers to the drive motor.

11. Device as claimed in claim 1, wherein the processing of the hard surfacing comprises a flattening thereof by hammering of the hard surfacing and/or the arranging of a surface structure therein by the hammering.

12. Device as claimed in claim 1, wherein the first disc and the second disc are substantially circular, and wherein a central point of the first disc substantially corresponds to the central point of the second disc.

13. Device as claimed in claim 1, wherein a diameter of the first disc is smaller than a diameter of the second disc, and,
wherein the first disc and/or the second disc are manufactured substantially from metal.

14. Device as claimed in claim 1, wherein the support comprises a cover which surrounds the first and second discs on all sides, except for a side where hammer wheel holders with hammer wheels are mounted.

15. Device as claimed in claim 1, wherein the support remains substantially stationary relative to the frame and the vehicle during rotation of the rotatable hammering unit.

16. Device as claimed in claim 1, comprising hammer wheel holders that are configured to be mounted releasably on the second disc and/or to be mounted at different radial distances relative to the central point of the second disc.

17. Device as claimed in claim 16, wherein the hammer wheels are manufactured from steel and have a running surface which is provided with a number of steel protrusions extending substantially radially from the running surface.

18. Vehicle to which a device as claimed in claim 1, is releasably coupled.

19. Method for processing a hard surfacing with a vehicle as claimed in claim 18, comprising of:
placing the hammering unit on the surfacing; and
displacing the hammering unit over the surfacing with the vehicle and simultaneously rotating the hammering unit with the drive motor for a purpose of processing the surfacing, the processing comprising flattening the surfacing and/or arranging a surface structure in the surfacing, by hammering with the hammer wheels.

20. Device as claimed in claim 1, wherein a number of coupling elements is eight or more.

21. Device as claimed in claim 1, wherein a number of hammer wheel holders is at least 32.

22. A device for processing a hard surfacing, the device comprising:
a frame to be mounted on a vehicle;
a support coupled to the frame;
a drive motor, mounted on the support, with drive shaft for rotating a hammering unit relative to the support;
a rotatable hammering unit configured to process the hard surfacing under the hammering unit by hammering, grinding and/or polishing the hard surfacing with hammers, the hammering unit comprising:
a substantially flat first disc;
a substantially flat second disc coupled via at least three coupling elements to the first disc and extending parallel to the first disc;
wherein the flat first disc is connected to the drive shaft of the drive motor for a purpose of rotating the first and second flat discs in a plane of the first disc,
wherein the second disc comprises on a flat side remote from the first disc a plurality of hammer wheel holders with hammer wheels, wherein the hammer wheel holders are distributed substantially uniformly along a circular periphery, a central point of which corresponds to a central point of the second disc; and
wherein the at least three coupling elements are vibration-damping coupling elements configured to provide a vibration-damping coupling between the first and second disc,
wherein essentially the only coupling between the first and second disc is formed by the vibration-damping coupling elements, and
wherein the at least three vibration-damping coupling elements are arranged between the first and second disc at positions which are substantially uniformly distributed over one or more concentric circles, the central points of which correspond to the central point of the second disc.

* * * * *